United States Patent [19]
Bauer

[11] 3,937,450
[45] Feb. 10, 1976

[54] SLIDING PISTON GAS SPRING
[76] Inventor: Fritz Bauer, Schulstr. 14, 8503 Altdorf, near Nurnberg, Germany
[22] Filed: Dec. 2, 1974
[21] Appl. No.: 528,690

[52] U.S. Cl. .............................. 267/113; 267/65 R
[51] Int. Cl.² .......................................... F16F 5/00
[58] Field of Search.... 267/65 R, 65 A, 64 R, 64 A, 267/113

[56] References Cited
UNITED STATES PATENTS
2,537,491  1/1951  Thornhill .......................... 267/65 R
3,794,309  2/1974  Chrokey et al. .................. 267/65 R Primary Examiner—James B. Marbert
Attorney, Agent, or Firm—Browdy and Neimark

[57] ABSTRACT

A gas-spring comprises a two-part piston assembly, with an outer piston which slides axially between two stops with respect to the piston rod, a damping passageway, and a valve seat on the piston rod against which the sliding piston seats.

6 Claims, 4 Drawing Figures

SLIDING PISTON GAS SPRING

FIELD OF THE INVENTION

The invention relates to gas springs, and, more particularly, to gas springs consisting essentially of a housing made of a cylindrical tube and a piston rod mounted coaxially for an axial movement past a seal in said housing, such rod supporting one guide piston and one damping piston, with asymmetric damping, the piston rod projecting out of one end of the housing and acting as a compressing cylinder, with at least one constantly open damping bore and at least one passageway being provided in the guiding and damping pistons, such passageway being open when the piston rod moves in one direction and closed when the piston rod moves in the other direction.

BACKGROUND OF THE INVENTION

In gas springs of this type, a great many guide and damping pistons are known, which are of such design that differently constructed guide and damping pistons are required for different housing diameters or different piston rod diameters.

This approach has many obvious disadvantages. Thus, many sizes of pistons must be fabricated, each size having an outer diameter corresponding to the inner diameter of a different cylinder. Besides providing increased cost of manufacture due to the necessity of making so many different sizes of pistons, there are additional warehousing problems and quality control problems.

Other problems in these gas springs have included an overly complex construction, occasional difficulties maintaining good guidance of the sliding piston within the cylinder, and occasional problems from binding of the piston rod causing leakage of gas from the cylinder.

SUMMARY OF THE INVENTION

It is, accordingly, an object of the invention to overcome defects in the prior art, such as indicated above.

It is another object to provide for improved gas springs.

Another object of the invention is to construct a gas spring of the type described above such that the guide and damping pistons can be inserted with only minor changes, even for different housing or piston rod diameters.

The objects are achieved according to the invention by providing a guide and damping piston means consisting of a sliding piston mounted coaxially on the piston rod between two stops and axially displaceable along the internal wall of the housing in a guiding fashion, and a valve body fastened axially on the piston rod at least in the direction of the internal chamber of the housing, serving as a stop for the sliding piston, with the valve body and sliding piston being in contact with each other via corresponding valve seat surfaces and with at least one passageway being provided in the sliding piston behind the matching valve seat surface.

With the design of the guide and damping pistons according to the present invention, a reliable, asymmetric damping is achieved. If the diameter of the housing is changed, only the outside diameter of the sliding piston need be changed. If the piston rod diameter changes, only the segment of the piston rod which supports the sliding piston and the valve housing need be brought to the corresponding size. Since the sliding piston has a relatively large axial length with respect to other, conventional sliding pistons, i.e., the known plate-shaped pistons, particularly good guidance is ensured. In addition, automatic assembly is possible, since only parts mounted concentrically with respect to the piston rod axis are provided and no springs are used and so there is no need for automatic guiding devices.

The second stop for the sliding piston can be provided in a particularly simple fashion by a retaining ring which fits into an annular groove in the piston rod. By this means, the assembly is likewise considerably simplified. When the second stop is in an expanded segment of the bore of the internal bore of the sliding piston, especially when the sliding piston is formed by a retaining ring, it is ensured that the sliding piston will not strike the fastening element of the piston rod seal when the piston rod is fully extended.

If, according to a further advantageous feature of the invention, the valve body is fastened axially with respect to the internal space of the housing by a retaining ring which fits into an annular groove in the piston rod, on the one hand the assembly of the valve body is simplified and on the other hand, especially in comparison to riveting of the piston, bending of the piston rod is reliably prevented, which also means that leakage of the housing in the vicinity of the piston rod seal is reduced.

BRIEF DESCRIPTION OF THE DRAWING

Further advantages and features of the invention follow from the description of sample embodiments based on the drawings.

DETAILED DESCRIPTION OF ILLUSTRATED EMBODIMENTS

Figure 1:
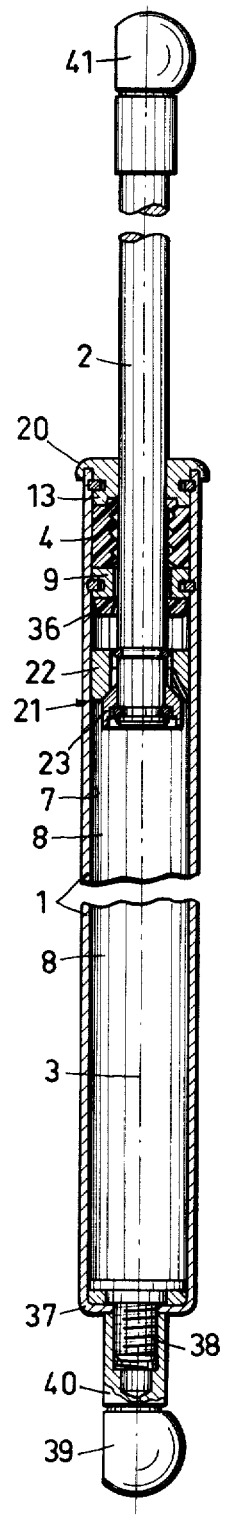
FIG. 1 shows a gas spring according to the invention, in lengthwise section.

The gas springs shown in the drawing consist essentially of a tubular or cylindrical housing 1, which is long with respect to its diameter, and is therefore slender; the housing is preferably made of a drawn steel tube. A piston rod 2, acting as a compressing piston, is mounted coaxially in housing 1, the piston rod also having a cylindrical cross section. The axis of the piston rod therefore coincides with the axis 3 of housing 1. The housing is sealed by means of a known multiple-lip seal 4 at the end (at the top of the drawing) from which the piston rod emerges from housing 1; the seal 4 has its lips 5 resting against the absolutely smooth surface of piston rod 2. The outer circumference 6 of lip seal 4 also effects a seal against the internal wall 7 of the housing 1, so that an absolutely tight closure of the housing 1 at the end from which the piston rod 2 emerges is achieved by this seal, which is of homogeneous construction and is therefore not protected.

At its end face, which rests against the internal chamber 8 of housing 1, the lip seal 4, whose length is approximately equal to its outside diameter, is fastened axially in place within the housing 1 by means of a cylindrical annular holding element 9. The diameter of the bore 9' of the fastening element is somewhat larger than the diameter of piston rod 2, so that the rod 2 does not contact and is not guided in the fastening element 9. The fastening element 9 has a radially recessed annular groove shaped depression 10 on its outside circumference which is in contact with internal wall 7 of the housing 11; a snap ring 11, i.e., an elastically deformable ring, is associated with and rests within the depression 10. The internal wall 7 of the housing 1 is provided with a corresponding annular groove, likewise recessed radially, into which snap ring 11 also fits.

The axial lengths of recess 10 and annular groove 12 are the same and of such size that snap ring 11 has practically no axial play when located within the recess 10 and the annular groove 12, so that the fastening element 9 is held in housing 1 with no axial play. The radial depth of annular recess 10 is at least as great as the radial width of snap ring 11, so that the snap ring can elastically deform and retreat completely into the recess 10 when the fastening element 9 is shoved into housing 1; then, when the recess 10 and the annular groove 12 line up radially, the ring 11 snaps into the annular groove 12 under elastic expansion, thus producing a permanent connection between the fastening element 9 and the housing 1 at this point.

Figure 2:
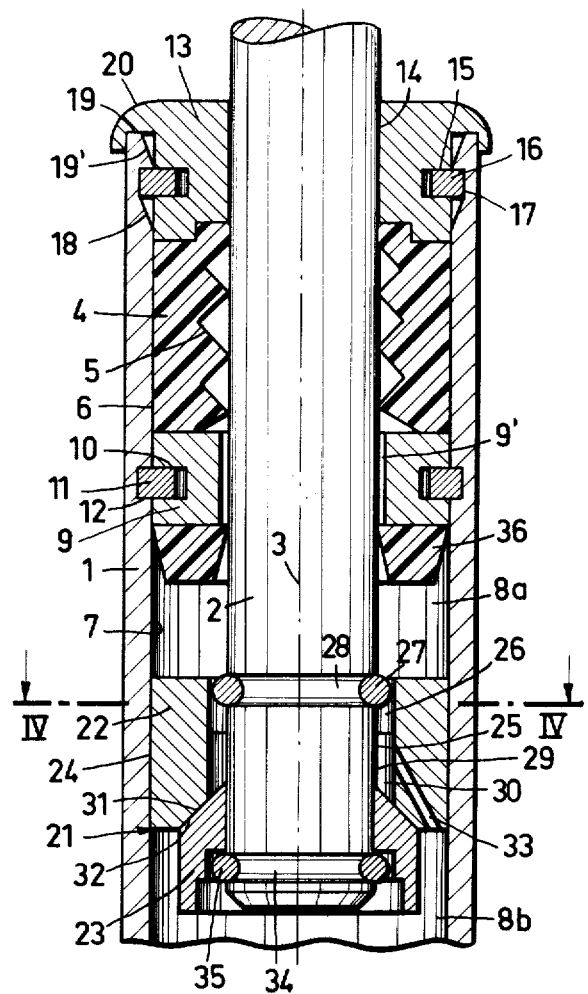
FIG. 2 shows the guide and damping pistons of the gas spring according to FIG. 1 on an enlarged scale.
Figure 4:
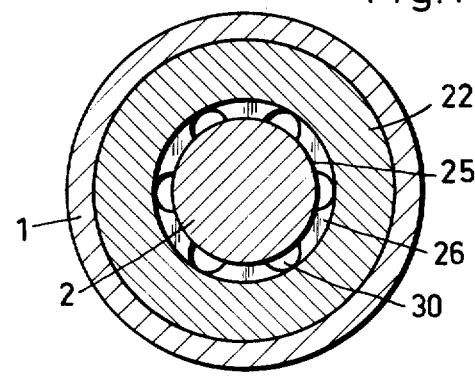
FIG. 4 is a cross-section along section line IV—IV in FIG. 2.

In the illustrative embodiment shown in FIGS. 1 and 2, the seal 4 is fastened axially at its outer end face by a similar, somewhat cylindrical annular guide element 13. This guide element 13 has its internal bore 14 fitting tightly against piston rod 2, so that piston rod 2 is guided radially in the guide element 13, and so that no contamination can enter the seal 4 from the outside. The guide element 13 is made preferably of a thermoplastic, i.e., elastic plastic, with good sliding characteristics with respect to steel, e.g., a polyolefin or PTFE or the like.

The guide element 13 is mounted axially in the housing in theoretically the same fashion as the fastening element 10. An annular recess 15 is provided on the cylindrical outer circumference of the guide element 13, the radial depth of such recess 15 being at least equal to the annular width of a snap ring 16 associated with this recess, the snap ring 16 being likewise practically free of axial play in the recess. The snap ring 16 fits into an annular groove 17 in the internal wall 7 of the housing. This annular groove 17 is different from the annular groove 12 by the fact that its side wall, resting against internal chamber 8 of the housing 1, is tapered outwardly from the bottom of the annular groove in the form of a truncated cone, so that a tapered surface 18 is formed to facilitate assembly of the device.

The internal wall 7 of the housing 1 has a similar taper 19' at its edge 19, which taper expands toward such edge also to facilitate assembly. The housing 1 is not plastically deformed in the entire area of the seal or over its length, i.e., it has a cylindrical outside surface which is completely rectilinear. The guide element 13 is formed in such fashion that it covers the edge 19 of the housing 1 with a shoulder 20, so that a clean and smooth closure of the gas spring is effected at this end.

The axial spacing of fastening element 9 and guide element 13 is such that the seal 4 is compressed axially to a desired degree, so that it is pressed radially by virtue of its elastic properties with a desired preset tension, on the one hand against the internal wall 7 of the housing 1 and on the other hand with its lips 5 against piston rod 2. The seal 4 consists of an elastic material, preferably polyurethane known by the registered trademark of "Vulkollan".

At the free end face of the fastening element 9, an annular shock absorber 36 made of rubber is provided, which prevents a hard impact of a sliding piston 22 against the fastening element 9 when the piston rod travels outwardly from the housing 1.

A guide piston 21 is mounted on the inner end of piston rod 2, such piston 21 consisting primarily of the sliding piston 22 and a valve body 23. The sliding piston 22 is made in a cylindrically annular shape and rests with its outer surface 24 against the internal wall 7 of the housing 1 with a small amount of play. Its internal bore 25 is coaxial with the piston rod, which it likewise accepts with a slight amount of play. On its side facing the seal 4 and the chamber 8a, the bore 25 has an increased bore section 26, whose diameter is sufficiently large to accept a retaining ring 27, which fits into a corresponding annular groove 28 on the piston rod 2. In the bore section 29 of the internal bore 25 which rests against the piston rod 2, several axially parallel passages 30 are provided, which terminate in the expanded section 26 of the bore.

At the end of the sliding piston 22 which terminates in the internal chamber 8b of the housing 1, an expansion in the shape of a truncated cone is provided which serves as a valve seat 31, against which the valve body 23 can rest with an appropriate valve seat surface 32. When the valve body 23 and the sliding piston 22 with its valve seat surfaces 31 and 32 are in contact, the passages 30 are closed. In addition, an additional diagonal damping bore 33 is provided in the sliding piston 22, which is not closed by valve body 23, and therefore permanently links the chambers 8a and 8b, in the housing 1, which are on both sides of guide piston 21.

The valve body 23 is fastened axially on the piston rod 2 in the direction of the internal chamber 8 of the housing 1 by means of a retaining ring 35 in an annular groove 34 on the piston rod to prevent the valve body 3 from sliding down off the piston rod 2. In addition, it is advantageously mounted without radial play on piston rod 2.

The housing 1 is closed at the end opposite the seal 4 in such a fashion that the edge 37 of the housing is flanged and fastened in a gas-tight manner coaxially with a threaded pin 38, so that a closure element 39 of any form desired, such as an eye or an element in the shape of spherical segments, can be fastened by means of a corresponding threaded bushing 40. At the opposite free end of piston rod 2 a closure element 41 is fastened in a similar fashion. By providing spherical-segment-shaped closure elements 39, 41, it is ensured that no bending moments can be transmitted to the housing 1 or the piston rod 2, so that leakage of the seal 4 is prevented at this end as well, which might be caused by uneven radial stress.

The assembly and method of operation of the gas spring is as follows:

Beginning at the end of the piston rod 2 located in the internal chamber 8 of the housing, the guiding element 13 with snap ring 16 is first threaded onto the piston rod, followed by the lip seal 4 (not yet prestressed), then the fastening element 9 with the snap ring 11 and finally the shock absorber 36. The sliding piston 22, followed by the valve body 23, is slid onto the piston rod 2, with the two parts being pushed until the sliding piston 22 is located at the transition from the expanded bore segment 26 to the narrowed bore segment 29 at the retaining ring 27. Then the retaining ring 35 is snapped into annular groove 34.

This pre-assembled unit is then inserted into the housing 1 from the outer end 19, so that snap ring 11 is pushed into the recess 10 in the retaining element 9 by the taper 19' so that it does not protrude beyond the outside circumference of the fastening element 9. When this snap ring 11 comes to the first annular groove 17, it snaps into it. Because of the tapered surface 18, however, the fastening element can be pushed further, since snap ring 11 is again compressed by the tapered surface 18. When it comes to the next annular groove 12, it snaps into it permanently. When the guide element 13, with simultaneous axial compression of lip seal 4, is slid sufficiently far into the housing that recess 15 and annular groove 17 line up, the snap ring 16 also snaps into this annular groove, so that the guide element is likewise protected permanently against axial sliding outwardly. The internal chamber 8 of the housing 1 is then filled in known fashion with compressed gas.

When the piston rod is pushed into the internal chamber 8 of the housing 1, the sliding piston 22, under the influence of the force of the gas and likewise the force of friction against internal wall 7 and outside surface 24 of the sliding piston, rises from valve body 23 until its internal edge normally defining the base section 26 rests against the retaining ring 27. This allows gas to flow from the housing cavity 8b through the passage 33 and between the valve seat surfaces 31 and 32 through passages 30 and the expanded bore section 26 into the chamber 8a.

On the other hand, if the release of stress from piston rod 2 causes the latter to be pushed out of the housing 1, the sliding piston 22 with its valve seat 31 is pressed against valve seat surface 32 of valve body 23, so that passages 30 are closed and gas can only flow through damping bore 33. The gas spring therefore exerts a greater damping effort when the piston rod travels outwardly than when the piston rod is shoved into the housing.

Figure 3:
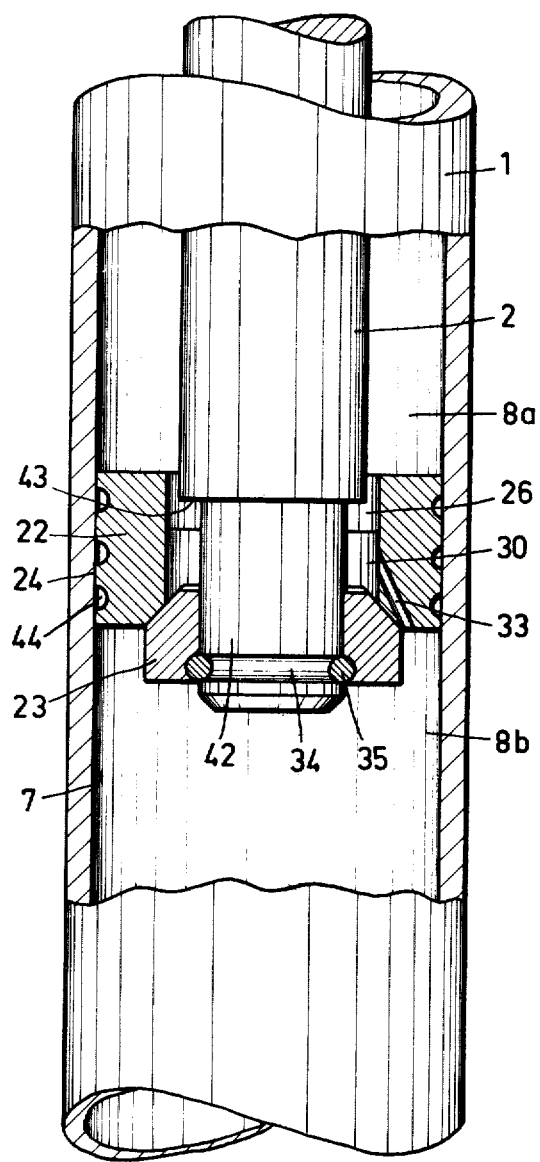
FIG. 3 shows a guide and damping piston in modified form, likewise on an enlarged scale, in a lengthwise section.

In the sample embodiment according to FIG. 3, a piston rod 2 is shown with a larger diameter than in the sample embodiments shown in FIGS. 1 and 2. In this case, a pin 42, which has the diameter of the piston rod in FIGS. 1 and 2, is screwed into the inner end of piston rod 2. The connection formed by the transition from piston rod 2 to pin 42 now serves as a stop for the sliding piston 22, so that the retaining ring 27 and annular groove 28 of the FIG. 1 embodiment can be omitted.

On the outside surface 24 of the sliding piston 22, in either embodiment, lubricating grooves 44 can be provided so that the friction between sliding piston 22 and the internal wall 7 of housing 1 can be reduced to a minimum.

It will be obvious to those skilled in the art that various changes may be made without departing from the scope of the invention and the invention is not to be considered limited to what is shown in the drawings and described in the specification.

What is claimed:

1. In a gas spring having a housing formed by a cylindrical tube and a piston rod which acts on compressing piston and is mounted coaxially in said housing, said piston rod supporting a guide and damping piston means with asymmetric damping, said rod protruding from one end of the housing and being provided with a seal, said guide and damping piston means having at least one constantly open damping passageway and at least one passageway which is open when the piston rod travels in one direction and closed when the piston rod travels in the other direction, the improvement wherein:
   said guide and damping piston means comprises a sliding piston coaxial with said piston rod and displaceable axially along said rod between two stops, said sliding piston resting in a guiding fashion on the internal wall of said housing, and
   a valve body on said piston rod and maintained from coming off the end of said piston rod, said valve body facing the internal chamber of the housing and serving as one of said two stops for said sliding piston,
   said valve body and said sliding piston having complementary corresponding valve seat surfaces, and said passageway open when said piston rod travels in one location and closed when said piston rod travels in said other direction being located in said sliding piston behind its complementary valve seat surface.

2. A gas spring according to claim 1, wherein the second of said stops comprises a fastening ring retained in an annular groove on said piston rod.

3. A gas spring according to claim 1, wherein the second of said stops comprises an expanded segment of said sliding piston.

4. A gas spring according to claim 1, wherein said valve body is maintained from coming off the end of said piston rod by a retaining ring which fits into an annular groove in said piston rod.

5. A gas spring according to claim 1, wherein said complementary corresponding valve seat surfaces are frustroconical in shape.

6. A gas spring comprising a housing formed by a cylindrical tube and a piston rod which acts as a compressing piston, mounted coaxially in said housing, supporting a guide and damping piston with asymmetric damping, said rod protruding from one end of the housing while being provided with a seal, with at least one constantly open damping passageway and at least one passageway which is open when the piston rod travels in one direction and closed when the piston rod travels in the other direction being provided in the guide and damping pistons,
   the guide and damping pistons consisting of a sliding piston coaxially displaceable between two stops, resting in a guiding fashion on the internal wall of said housing and a valve body fastened axially at least to the piston rod in the direction of the internal chamber of the housing and serving as a stop for the sliding piston, with the valve body and sliding piston being connected by matching corresponding valve seat surfaces, and in which at least one passageway is provided in the sliding piston behind the matching valve seat surface, said last mentioned passageway corresponding to said one passageway which is open when the piston rod travels in one direction and closed when the piston rod travels in the other direction.

* * * * *